(12) United States Patent
Hein et al.

(10) Patent No.: US 7,138,727 B2
(45) Date of Patent: Nov. 21, 2006

(54) VEHICULAR ACCESSORY CONTROL PANEL

(75) Inventors: David A. Hein, Sterling Heights, MI (US); Robert M. Schmidt, Livonia, MI (US)

(73) Assignee: Lear Corporation, Southfield, MI (US)

( * ) Notice: Subject to any disclaimer, the term of this patent is extended or adjusted under 35 U.S.C. 154(b) by 226 days.

(21) Appl. No.: 10/894,543

(22) Filed: Jul. 20, 2004

(65) Prior Publication Data

US 2006/0017326 A1 Jan. 26, 2006

(51) Int. Cl.
  *B60L 1/00* (2006.01)
(52) U.S. Cl. .................... 307/9.1; 307/10.1; 345/156; 345/184
(58) Field of Classification Search ............... 307/10.1, 307/9.1; 345/184, 156, 168
  See application file for complete search history.

(56) References Cited

U.S. PATENT DOCUMENTS

| | | | |
|---|---|---|---|
| 4,896,370 A * | 1/1990 | Kasparian et al. ............. 455/77 |
| 4,983,951 A * | 1/1991 | Igarashi et al. ............. 340/461 |
| 6,448,893 B1 | 9/2002 | Dobberkau et al. |
| 6,666,492 B1* | 12/2003 | Schmidt et al. ............... 296/70 |
| 6,717,287 B1 | 4/2004 | Tengler et al. |
| 6,720,937 B1 | 4/2004 | Neugart et al. |
| 6,956,540 B1* | 10/2005 | Yoshihara et al. ........... 345/1.1 |
| 7,002,089 B1* | 2/2006 | Stevenson .................... 200/512 |
| 2003/0128103 A1* | 7/2003 | Fitzpatrick et al. ...... 340/425.5 |
| 2004/0031667 A1 | 2/2004 | Dinkel et al. |
| 2004/0056837 A1* | 3/2004 | Koga et al. .................. 345/156 |
| 2004/0061662 A1* | 4/2004 | Yoshihara et al. ........... 345/1.1 |
| 2004/0201578 A1* | 10/2004 | Sadahiro ...................... 345/173 |

FOREIGN PATENT DOCUMENTS

| | | |
|---|---|---|
| JP | 2002308018 | 10/2002 |
| JP | 2003345263 A * | 12/2003 |
| WO | WO 2003/080391 | 10/2003 |

* cited by examiner

*Primary Examiner*—Brian Sircus
*Assistant Examiner*—Daniel Cavallari
(74) *Attorney, Agent, or Firm*—MacMillillan, Sobanski & Todd, LLC

(57) ABSTRACT

An apparatus in an instrument panel of a vehicle includes a first accessory control unit disposed in the instrument panel and a second accessory control unit disposed in the instrument panel. The second accessory control unit is juxtaposed with the first accessory control unit. A moveable switch panel is deployable in a first position covering at least a portion of the first accessory control unit and is deployable in a second position covering at least a portion of the second accessory control unit. The movable switch panel includes a plurality of manually actuable switch elements adaptable in response to being deployed in the first or second position to provide a first set of switch functions while in the second position and a second set of switch functions while in the first position.

20 Claims, 4 Drawing Sheets

VEHICULAR ACCESSORY CONTROL PANEL

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

1. Field of the Invention

The present invention relates in general to a moveable switch panel for activating vehicle accessories, and more particularly, to a moveable switch panel utilizing common switch elements that are reconfigurable for dual functionality based on the position of the moveable switch panel.

2. Description of the Related Art

Vehicle accessory input controls typically consist of a plurality of buttons, knobs, or menu driven display screens located on an instrument panel within the passenger compartment of a vehicle for controlling accessories such as multimedia, navigation, and climate control systems. Often the center console area of the instrument panel is cluttered with a large number single push button switches to control as many of the vehicle accessory functions as possible. Numerous amounts of switches are often aesthetically displeasing to a user. The more switches required to provide the ever increasing accessory functionality, the smaller the size each switch becomes in order to package them in the available space. Generally a user desires larger size switches in an uncluttered center console area.

Reconfigurable display units have been utilized to overcome the cluttered appearance of the center console area. Reconfigurable display units utilize either display screens or touch screens with menu driven options. The number of switches can be greatly decreased with the utilization of only a few switches to control the menu driven options. However, complicated menu structures are cumbersome to use because the user is required to transition through several menu screens in order to get to the desired function. Simple operation is desired to avoid a distraction to the driver operating the vehicle accessories.

SUMMARY OF THE INVENTION

The present invention provides a moveable switch panel that is moveable between a first position and a second position for including additional vehicle accessory controls for an instrument panel. The moveable switch panel includes common switch elements which are re-configured to provide a first set of switch functions or a second set of switch functions based on the position of the moveable switch panel.

In one aspect of the invention, an apparatus is provided in an instrument panel of a vehicle including a first accessory control unit disposed in the instrument panel juxtaposed with a second accessory control unit disposed in the instrument panel. A moveable switch panel is deployable in a first position covering at least a portion of the first accessory control unit and is deployable in a second position covering at least a portion of the second accessory control unit. The movable switch panel includes a plurality of manually actuable switch elements adaptable in response to being deployed in the first or second position to provide a first set of switch functions while in the second position and a second set of switch functions while in the first position.

DETAILED DESCRIPTION OF PREFERRED EMBODIMENTS

Figure 1:
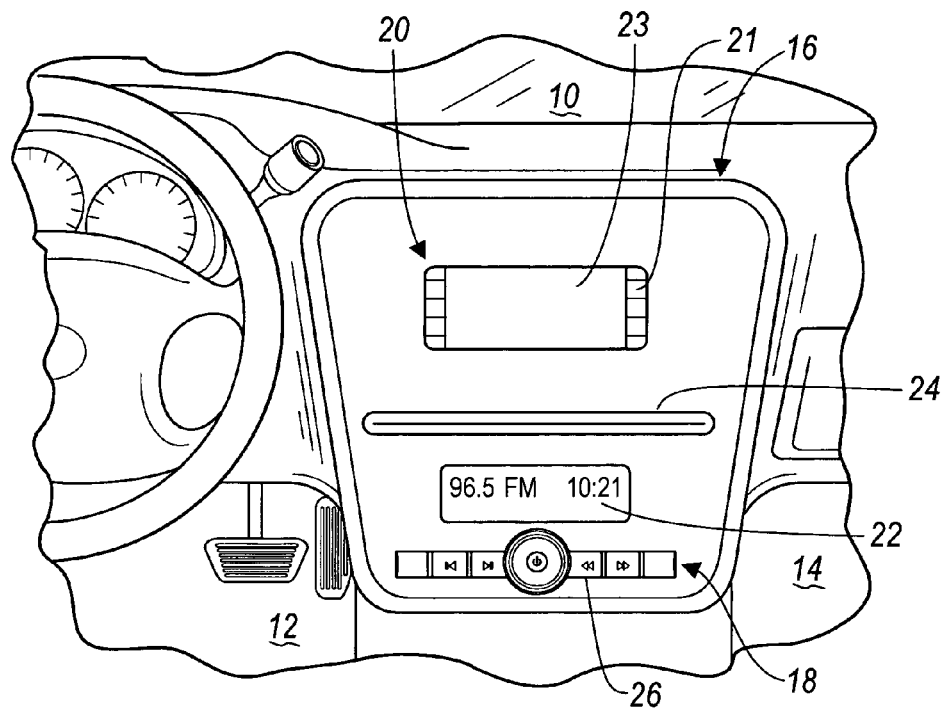
FIG. 1 is a perspective view of an instrument control panel for controlling vehicle accessories.

Referring now to the Drawings and particularly to FIG. 1, there is shown an interior passenger compartment 10 of a vehicle according to the present invention. The interior passenger compartment 10 comprises a front driver's seating area 12, a front passenger seating area 14, and a center accessory control unit 16. The center accessory control unit 16 (i.e., instrument panel) includes first and second accessory control units. The first accessory control unit comprises a multimedia control unit 18 and the second accessory control unit comprises a navigation display unit 20. The multimedia display unit 18 includes a multimedia display 22, a CD player 24 and multimedia controls 26. The multimedia controls 26 include control switches that control dual multimedia functions dependent upon the source activated (i.e., radio, CD, DVD, etc.). Control switches may include CD, radio, fast forward, reverse, seek up, seek down, tune, search, or preset memory.

The navigation display unit 20 includes a navigation display screen 23 and a plurality of contact switches 21 for making selections in a menu-style system to control operation of the navigation system and also to perform as a multi-system controller for other accessory functions. Thus, the navigation display unit 20 includes dual functionality where the mode of operation changes between the navigation functionality and climate control functionality through the activation of a respective source switch, for example. The selections for operation may be chosen through the selection of menus or navigating through a touch screen. Typical switches included for controlling HVAC system functionality include temperature increase/decrease, defrost, A/C, blower motor, and blower motor output porting.

In other preferred embodiments, the first and second accessory control units may comprise other types of accessory controls that are used in the vehicle in place of or in combination with multimedia systems, navigation systems, or climate control systems. Other accessory controls may comprise lighting systems, traction/braking control systems, powertrain control systems, driver awareness systems, phone systems, and internet systems.

Figure 2:
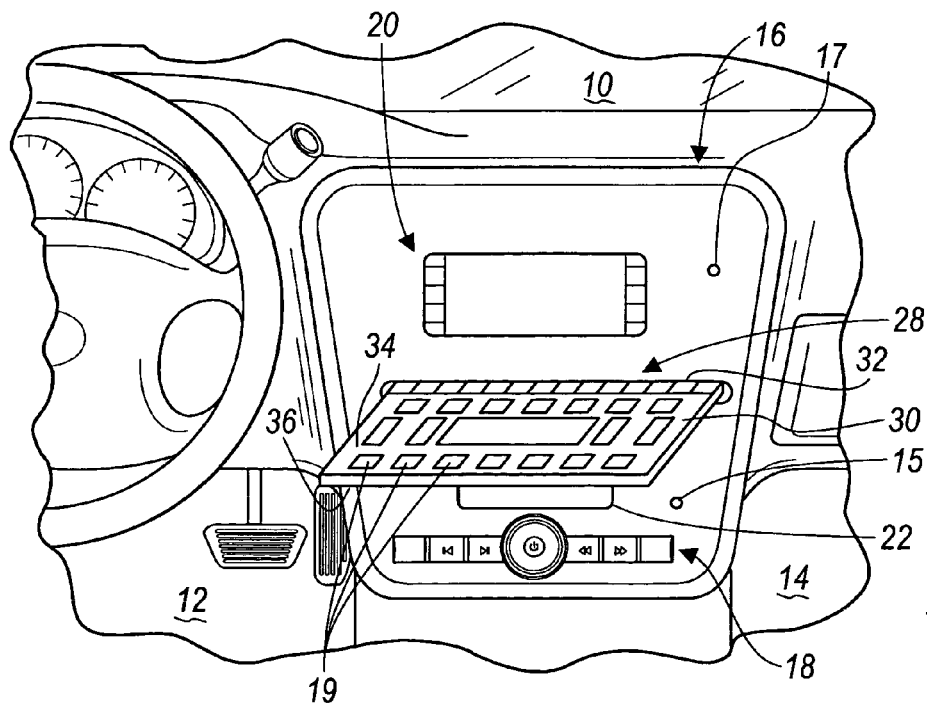
FIG. 2 is a perspective view of a moveable switch panel according to a first preferred embodiment of the present invention.

FIG. 2 illustrates a view of an instrument panel with a moveable switch panel integrated therein. The moveable switch panel includes a flippable control multi-planar panel 28. The panel 28 includes a planar member 30 having a first planar surface 34 and a second planar surface 36. The planar member 30 is pivotable about an axis. A hinge 32 defines the axis of rotation. The hinge 32 couples the planar member 30 to the center accessory console unit 16 with the planar member 30 being pivotable about the hinge 32. FIG. 2 shows panel 28 in an intermediate (inoperable) position. The hinge provides positive retention in the fully upward and downward positions.

A plurality of switches 19 is embedded within the planar member 30. In the preferred embodiment, the plurality of switches 19 include non-contact switch elements, although in other preferred embodiments, other types of switches may be used. The plurality of switches 19 is actuable from the first planar surface 34 for actuating a first set of switch functions. The plurality of switches 19 is also actuable from the second planar surface 36 for activating a second set of switch functions. When using the non-contact switch, a same respective switch can be used to detect user actuation from either side of the planar member 30. As a result, dual functionality can be offered through the incorporation of one embedded switch. The planar member 30 can be much thinner in comparison to a control panel utilizing conventional membrane switches which would require a set of opposing mechanical switches on both sides of the control panel. In the preferred embodiment, utilizing non-contact switch technology, the planar member 30 can be approximately 5 to 10 mm in width. Non-contact switches include touch control switches that utilize an electric field sensor to detect an object (e.g. finger) that is displaced within the electric field. The object selectively displaced within the electric field changes the electric field thereby producing a potential variation within the electric field. The potential variation is associated with a user request to activate a vehicle accessory. The non-contact switches are low profile in application and allow for seamless integration within the instrument panel. This allows for an aesthetically pleasing appearance of the center accessory console unit 16. Non-contact switches may be produced using field effect, piezoelectric, or capacitive technology.

At least one position sensor is used to detect the orientation/position of the planar member for determining which sets of controls are operable when a respective switch from a respective planar surface is activated. The position sensor includes a mechanical spring-loaded make and break switch that makes the electrical contact when the planar member 30 is in a respective position. For example, a first position switch 15 may be located on a lower portion of the center accessory console unit 16 while a second position switch 17 may be located on an upper portion of the center accessory console unit 16. When the planar member 30 is pivoted to a downward vertical position, the planar member 30 contacts the first position switch 15. The spring-loaded mechanical contacts of the first position switch 15 are made thereby providing a signal to a controller (not shown) to configure the first set of switch functions associated with the first planar surface 34 to be active for actuation. Alternatively, when the planar member 30 is pivoted to an upward vertical position, the planar member 30 contacts the second position switch 17. The spring-loaded mechanical contacts of the second position switch 17 are made thereby providing a signal to the controller to configure the second set of switch functions associated with the second planar surface 36 to be active for actuation. In alternative embodiments, electrical non-contact sensors such as proximity sensors may be used in place of the mechanical switches to sense the position of the planar member with respect to the upper and lower portion of the multimedia control unit 18.

Figure 3:
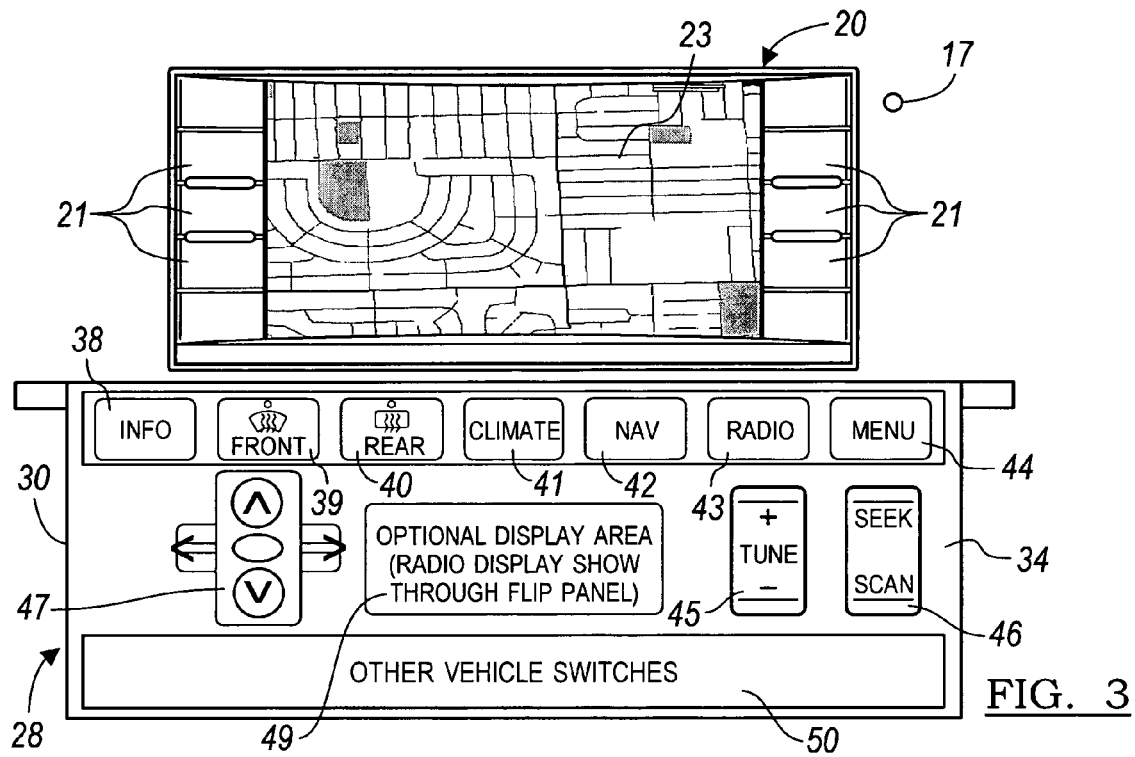
FIG. 3 is a partial view of a moveable switch panel in a first position according to the first preferred embodiment of the present invention.

FIG. 3 illustrates a partial view of the panel 28 in a first position according to the first preferred embodiment of the present invention. The first planar surface 34 includes active button areas for activating the first set of switch functions. While in the first position, the navigation display unit 20 is visible on the upper portion of the center accessory console unit 16. The navigation display unit 20 includes the plurality of contact switches 21 for selecting options from a menu-driven display screen 23. Optionally, the display screen 23 may include a touch screen for activating options by selecting user choices on a reconfigurable display touch screen.

When the planar member 30 is in the first position, the planar member 30 covers at least a portion of the multimedia control unit 18. While in the first position, controls for the multimedia control unit 18 may be activated by two methods. Switch actuation for multimedia controls may be performed directly from respective switches disposed on the first planar surface 34. The first planar surface 34 includes a tune switch 45 and a seek/scan switch 46 for performing each respective function. A display window 49 may be integrated within the planar member 30 for allowing the visual display of a portion of the underlying multimedia control unit 18 such as the radio display window. This allows the user to visually see detailed information such as the current radio station, CD selection, and CD track number and other information displayed on the radio display window. The display window 49 may include an open recess area for direct viewing or may include a transparent material such as plastic or glass for protection or aesthetic purposes.

Alternatively, radio functionality as well as other vehicle accessory functions may be controlled through the navigation display unit 20 by selecting a respective accessory source mode switch. A climate source switch 41, a navigation source switch 42, and a radio source switch 43 can be actuated from the first planar surface 34. Alternatively, a menu source switch 44 displays a list of accessory source options on the display screen 23 for selection. The plurality of contact switches 21 located on the navigation display unit 20 allows a user to make a selection from the menu driven choices. For example, activating the radio source switch 43 displays a plurality of multimedia-related selections of which to choose from as displayed on display screen 23. Similarly, activating the climate source switch 41 displays a plurality of climate control-related selections of which to choose from as displayed on the display screen 23. In addition, first planar surface 34 includes direct control switches for activating a climate control function such as the front defrost switch 39 and the rear defrost switch 40. A temperature control adjustment switch 47 may also be selected for adjusting the temperature directly from the first planar surface 34. A plurality of other vehicle accessory functions may be actuated using control switches, generally shown at 50, on the first planar surface 34.

Figure 4:
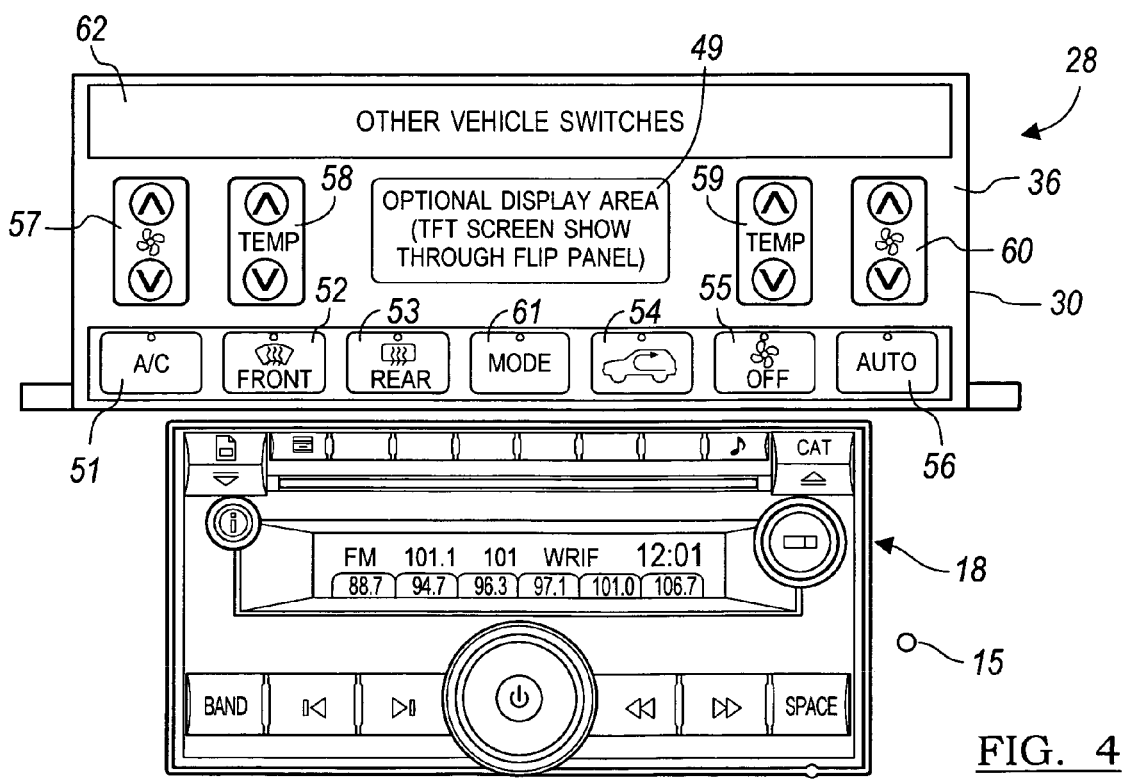
FIG. 4 is a partial view of a moveable switch panel in a second position according to the first preferred embodiment of the present invention.

FIG. 4 illustrates a partial view of the flip panel 28 in a second (upward) position. When the planar member 30 is pivoted to the second position, the planar surface 30 covers at least a portion of the navigation display unit 20. The multimedia control unit 18 is visible on the lower portion of the center accessory console unit 16. The multimedia control unit 18 controls the multimedia functions as discussed supra. When in the second position, the second position sensor 17 (shown in FIG. 3) senses that the planar member 30 is in a vertical upright position and signals to the controller to configure the switch elements so that the second set of switch functions associated with the second planar surface 36 are active for actuation. Such controls include a A/C switch 51 for activating an air conditioning unit, a front defrost switch 52, a rear defrost switch 53, a air re-circulation switch 54, an auto mode switch 56, and blow motor off switch 55. A driver side temperature control unit includes a driver's side blower motor switch 57 and a driver's side temperature adjustment switch 58. Also shown is a passengers side temperature control unit which includes a passenger's side temperature switch 59 and a passenger's side blower motor switch 60. The display window 49 allows the visual display of a portion of the underlying navigation display unit 20. The navigation or other source displayed on the display screen 23 may be activated by selecting the mode source switch 61 for visual display. A plurality of other vehicle accessory functions may be actuated using control switches, generally shown at 62, on the second planar surface 36.

Figure 5:
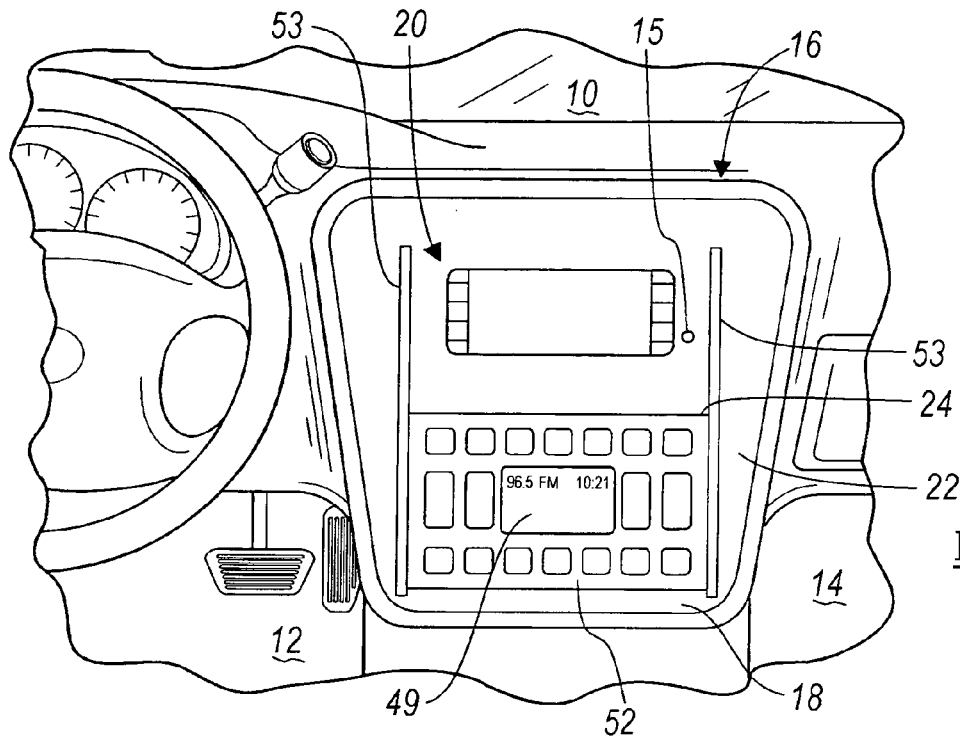
FIG. 5 is a perspective view of a moveable switch panel according to a second preferred embodiment of the present invention.

FIG. 5 illustrates a view of the center accessory control unit 16 utilizing a sliding panel for integrating additional vehicle accessory controls according to a second preferred embodiment. A sliding planar member 52 is slidingly attached to the center accessory control unit 16. The sliding planar member 52 is moveable in a vertical direction between the first and second positions covering the center accessory control unit and the second center accessory control unit. A set of rails 53 engages the sliding planar member 52 to allow vertical movement. In other embodiments, alternative slide mechanisms may be used to vertically displace the sliding planar member 52. At least one position sensor is disposed on the center accessory control unit 16 for detecting the position of the sliding planar member 52. The position sensor may include electromagnetic sensor such as a proximity sensor or mechanical switch for determining the position of the sliding planar member 52. In this embodiment, the plurality of accessory control switches maintain the same layout whether the sliding planar member 52 is the first position (i.e., lower portion of the center accessory control unit) or the second position (i.e., upper portion center accessory control unit)

Similar to the planar member 30 of FIG. 3 when the sliding planar member 52 is in the first position at least a portion of the multimedia control unit 18 is covered by the sliding planar member 52. The display window 49 allows visual access to the underlying multimedia display. Similar to FIG. 4, when the sliding planar member 52 is in the second position, at least a portion of the navigation display unit 20 is covered by the sliding planar member 52. The display window 49 allows visual access to the underlying navigation display unit 20.

As the sliding planar member 52 transitions to a respective position, the position sensor senses the position of the sliding planar member 52 and reconfigures the functions related to the vehicle accessory switches accordingly. As a result, the same layout of the vehicle accessory switches is used but functionality of the sliding planar member 52 changes between the first position and the second position. Different accessory switch illumination schemes may be used to excite the graphical display associated with the respective switch based on the position of the sliding planar member 52 such as LED backlighting, lightpiping, or electroluminescence lighting.

Figure 6:
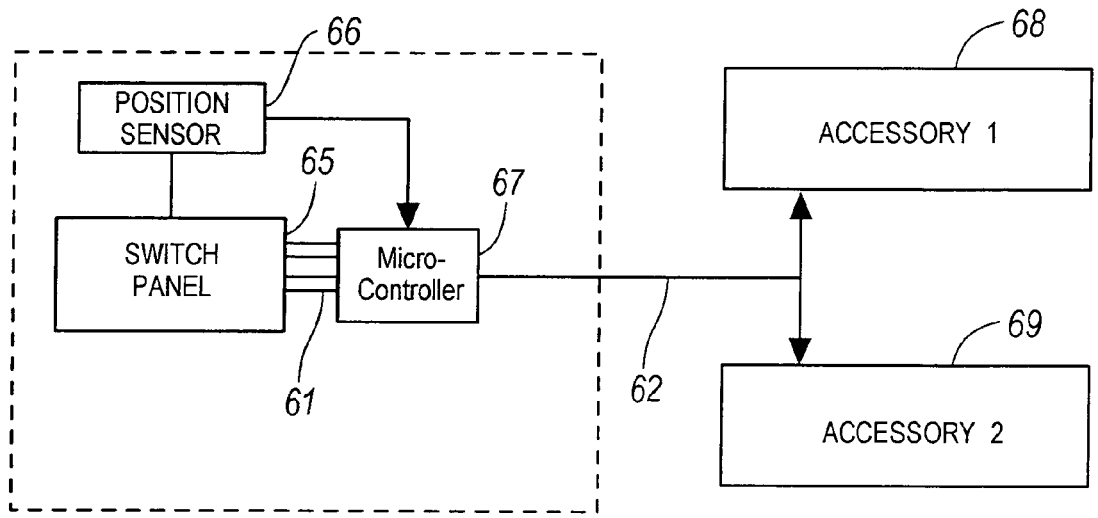
FIG. 6 is a block diagram of an electrical schematic according to a preferred embodiment of the present invention.

The schematic, as shown in FIG. 6, illustrates the electrical schematic for switching input functionality for the moveable switch panel. The moveable switch panel 65 is electrically connected to the position sensor 66 and a microcontroller 67. A plurality of input communication lines 61 connected between the moveable switch panel 65 and the microcontroller 67 each broadcast a respective input signal from a respective switching element within the moveable switch panel 65. A multiplex bus 62 is used to couple signals between from the microcontroller 65 and each of the respective accessories. The multiplexing bus 62 minimizes the number of communication lines providing input signals to each of the respective accessories.

The moveable switch panel 65 provides an input signal to the microcontroller 67 based the actuation of a respective switch element on the moveable switch panel 65. The position sensor 66 determines whether the moveable switch panel 65 is in the first position or the second position. Based on the position of the moveable switch panel 65, the position sensor 66 outputs a position signal to the microcontroller 67 indicative of the position of the moveable switch panel 65. The microcontroller 67 generates an output signal to a respective accessory in response to an actuation of a respective switch element and the position of the moveable switch panel 65 as detected by the position sensor 66. For example, the microcontroller 67 will activate a first accessory 68 or a function of the first accessory 68 associated with a respective actuated switch element when the moveable switch panel 65 is in the first position. Alternatively, the microcontroller will activate a second accessory 69 or a function of the second accessory 69 associated with same respective actuated switch element when the moveable switch panel 65 is in the second position.

Figure 7:
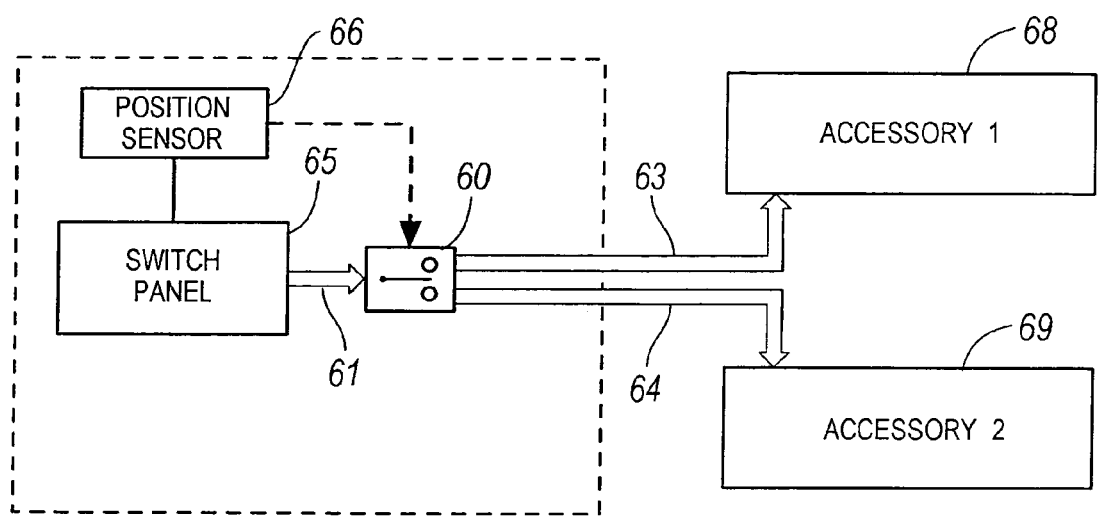
FIG. 7 is a block diagram of an electrical schematic according to a second preferred embodiment of the present invention.

FIG. 7 illustrates an alternative embodiment of the electrical schematic, an electrically controlled, gauged switch 60 (e.g., multiplex switch) is used in place of the microcontroller 67 (FIG. 6) to distribute the input signals from the moveable switch panel 65 to a respective accessory. A plurality of input communication lines 61 is connected to the switch 60. Based on the position of the moveable switch panel 65 as detected by the position detector 66, the switch 60 will make a first contact or a second contact. A first plurality of output communication lines 63 will be connected between the switch 60 and the first accessory 68 for providing the input signals to the first accessory 68. A respective input line will have an associated output line such that the first plurality of output communications lines 63 has a same number of communication lines as the plurality of input communication lines 61. Similarly, a second plurality of output communication lines 64 will be connected between the switch 60 and the second accessory 69 for providing the input signals to the second accessory 69. A respective input line will have an associated output line such that the second plurality of output communications lines 64 has the same number of communication lines as the plurality of input communication lines 61.

Figure 8:
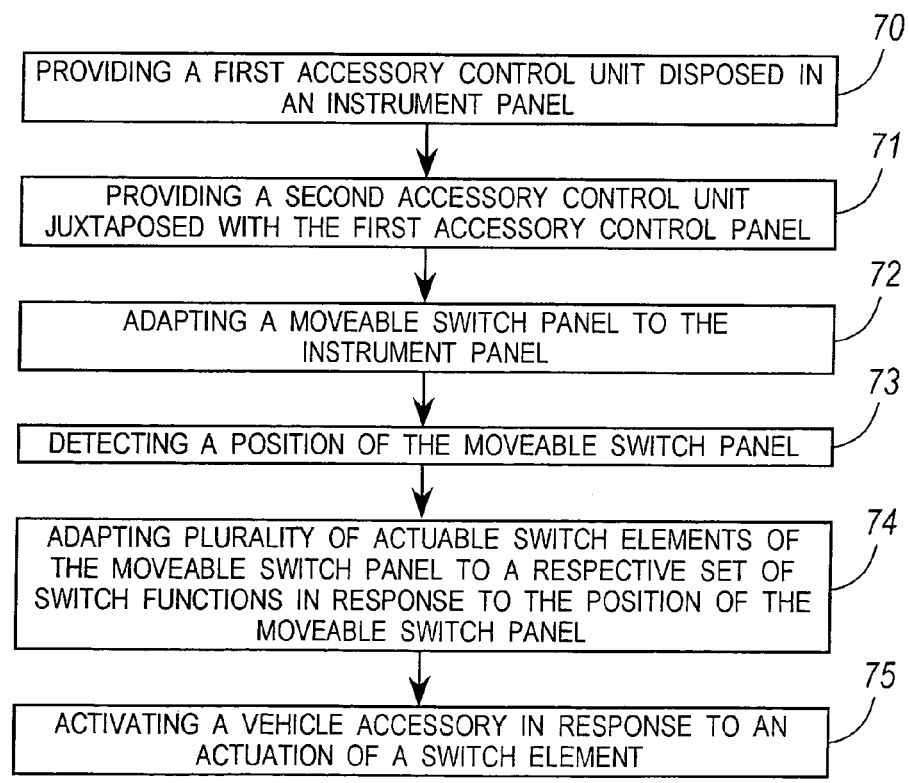
FIG. 8 is a method for activating accessories using a moveable switch panel.

FIG. 8 illustrates a method for a method for activating vehicle accessory switches in an instrument panel using a moveable switch panel. In step 70, a first accessory control unit is disposed within an instrument panel. The first accessory control unit includes comprises a multimedia unit. In step 71, a second accessory control unit is disposed within the instrument panel. The second accessory control unit comprises a navigation display unit. The second accessory control unit is juxtaposed to the first accessory control unit. In step 72, a moveable switch panel is adapted to an instrument panel. The moveable switch panel is also deployable to a first position so that the moveable switch panel covers at least a portion of the first accessory control unit. The moveable switch panel is deployable to a second position so that the moveable switch panel covers at least a portion of the second accessory control unit. The moveable switch panel includes a plurality of actuable switch elements that are adaptable in response to the position of the moveable switch panel. In step 73, the position sensor detects the position of the moveable panel. The position of the moveable panel determines which set of vehicle accessory switches is active for actuation. In step 74, the plurality of actuable switch element are adapted to a respective set of switch functions based on the position of the moveable switch panel as detected by the position sensor. In step 75, a respective vehicle accessory is activated in response to the actuation of a respective switch element of the moveable switch panel.

What is claimed is:

1. An apparatus in an instrument panel of a vehicle comprising:
   a first accessory control unit disposed in said instrument panel;
   a second accessory control unit disposed in said instrument panel juxtaposed with said first accessory control unit; and
   a moveable switch panel deployable in a first position covering at least a portion of said first accessory control unit and in a second position covering at least a portion of said second accessory control unit, said movable switch panel including a plurality of manually actuable switch elements adaptable in response to being deployed in said first or second position to provide a first set of switch functions while in said second position and a second set of switch functions while in said first position.

2. The apparatus of claim 1 further comprising a position sensor for detecting said position of said moveable switch panel.

3. The apparatus of claim 1 further comprising a hinge for coupling said moveable switch member to said instrument panel, said moveable switch panel being pivotable about said hinge, wherein said moveable switch panel including a first planar surface and a second planar surface, said switch elements are actuable from said first planar surface for actuating said first set of switch functions, and wherein said switch elements are actuable from said second planar surface for actuating said second set of switch functions.

4. The apparatus of claim 1 further comprising a rail structure for adapting said moveable switch member to said instrument panel, said moveable switch panel being slideable between said first position and said second position.

5. The apparatus of claim 1 wherein said switch elements include non- contact switches.

6. The apparatus of claim 5 wherein said non-contact switches include proximity sensors.

7. The apparatus of claim 1 wherein said second accessory control unit includes a navigation display unit.

8. The apparatus of claim 1 wherein said second accessory control unit includes a display screen.

9. The apparatus of claim 8 wherein said display screen includes a touch screen display.

10. The apparatus of claim 8 wherein at least one switch element of said moveable switch panel activates said display screen.

11. The apparatus of claim 1 wherein said first accessory control unit includes a multimedia control unit.

12. The apparatus of claim 1 wherein said manual actuable switch elements include switch functions for controlling at least climate control operations.

13. The apparatus of claim 1 wherein said manual actuable switch elements include switch functions for controlling at least multimedia operations.

14. The apparatus of claim 1 wherein said manual actuable switch elements include switch functions for controlling at least navigation operations.

15. The apparatus of claim 1 wherein said moveable switch panel includes a window portion for displaying a portion of a display area of a respective accessory unit when positioned over said respective accessory unit.

16. The apparatus of claim 1 wherein said first set of switch functions includes switch elements configured for operating a multimedia system and climate control system.

17. The apparatus of claim 1 wherein said second set of switch functions includes switch elements configured for operating a heating and ventilation accessory.

18. The method for activating vehicle accessory controls from an instrument panel using a moveable switch panel, the method comprising the steps of:
   providing a first accessory control unit disposed in said instrument panel;
   providing a second accessory control unit disposed in said instrument panel juxtaposed with said first accessory control unit; and
   adapting a moveable switch panel to said instrument panel, said moveable switch panel deployable in a first position covering at least a portion of said first accessory control unit and in a second position covering at least a portion of said second accessory control unit, said movable switch panel including a plurality of manually actuable switch elements adaptable in response to being deployed in said first or second position to provide a first set of switch functions while in said second position and a second set of switch functions while in said first position.

19. The method of claim 18 further including the step of detecting a position of said moveable switch panel.

20. The method of claim 18 further including the step of activating a respective accessory associated with a respective switch function in response to an actuation of a respective switch element and said position of said moveable switch panel.

* * * * *